United States Patent
Snyder et al.

(10) Patent No.: US 7,855,017 B1
(45) Date of Patent: Dec. 21, 2010

(54) STRUCTURAL BATTERIES AND COMPONENTS THEREOF

(75) Inventors: James F. Snyder, Havre de Grace, MD (US); Robert H. Carter, Jarrettsville, MD (US); Eric D. Wetzel, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 657 days.

(21) Appl. No.: 11/594,863

(22) Filed: Nov. 9, 2006

Related U.S. Application Data

(60) Provisional application No. 60/735,999, filed on Nov. 9, 2005.

(51) Int. Cl.
*H01M 6/18* (2006.01)
*H01M 4/62* (2006.01)
*H01M 6/16* (2006.01)
*H01M 8/10* (2006.01)

(52) U.S. Cl. .................. 429/304; 429/232; 429/306; 429/324; 429/483; 429/484; 429/491

(58) Field of Classification Search ............ 429/231.95, 429/232, 241, 242, 303, 304, 306, 324, 482, 429/483, 479, 491, 484
See application file for complete search history.

(56) References Cited

U.S. PATENT DOCUMENTS

| | | | |
|---|---|---|---|
| 5,176,969 A * | 1/1993 | Miyabayashi et al. ....... | 429/212 |
| 5,180,645 A | 1/1993 | More | |
| 5,212,026 A | 5/1993 | Mitchell | |
| 5,230,968 A | 7/1993 | Bones et al. | |
| 5,360,686 A * | 11/1994 | Peled et al. .................. | 429/312 |
| 5,478,668 A | 12/1995 | Gozdz et al. | |
| 5,567,544 A * | 10/1996 | Lyman ........................ | 429/152 |
| 5,793,603 A | 8/1998 | Lyman | |
| 6,224,994 B1 * | 5/2001 | Asukabe et al. ............... | 429/33 |

FOREIGN PATENT DOCUMENTS

JP 2002-305031 * 10/2002

OTHER PUBLICATIONS

South et al., Multifunctional Power-Generating and Energy-Storing Structural Composites for U.S. Army Applications, Mater. Res. Soc. Symp. Proc. vol. 851, 2005 Material Research Society, pp. NN4.6.1-NN4.6.12.*
Thomas, et al. "Mechanical design and performance of composite multifunctional materials" Acta Materialia, 52, 2155-2164 (2004).

* cited by examiner

*Primary Examiner*—Patrick Ryan
*Assistant Examiner*—Thomas H. Parsons
(74) *Attorney, Agent, or Firm*—William V. Adams; Christos S. Kyriakou

(57) ABSTRACT

A structural battery includes an anode, cathode and electrolyte which, taken collectively, have sufficient mechanical strength to allow the battery to be used as a structural component of an article of manufacture. The combined anode, cathode and electrolyte have a stiffness between 10 MPa-1000 GPa, and in certain instances have a stiffness between 50 MPa-100 GPa. Also disclosed are solid electrolytes which may be used in structural batteries. The electrolytes are comprised of salts dissolved in a solvent such as a body of polymeric material. The electrolyte has good ionic conductivity and good mechanical properties. The solid electrolyte may be comprised of a body of uncrosslinked polymer or an at least partially crosslinked polymer such as a multifunctional polymer having segments comprised of linear resins and segments comprised of crosslinking resins. Also disclosed are methods for manufacturing the structural batteries.

23 Claims, 3 Drawing Sheets

STRUCTURAL BATTERIES AND COMPONENTS THEREOF

RELATED APPLICATION

This application claims priority of U.S. Provisional Patent Application Ser. No. 60/735,999 filed Nov. 9, 2005, entitled "Structural Composite Battery."

GOVERNMENT INTEREST

The invention described herein may be manufactured, used, and licensed by or for the United States Government.

FIELD OF THE INVENTION

This invention relates generally to batteries which operate to store electrical energy. More specifically, the invention relates to batteries which are configured to function as structural elements of devices in which they are incorporated. In specific instances, the invention relates to particular components of structural batteries such as electrodes and electrolytes, and to methods for their manufacture.

BACKGROUND OF THE INVENTION

Batteries are electrochemical devices which store and release electrical energy. Batteries may include primary batteries which utilize a nonreversible chemical reaction to generate electricity, and hence are "one use" items; as well as rechargeable or storage batteries which employ a reversible chemical reaction for the generation of electricity. It is to be understood that the term "battery", in a strict sense, refers to an electrochemical generating system comprised of a plurality of interconnected electrochemical cells, each of which includes an anode, cathode, and electrolyte; however, in the context of this disclosure, the term "battery" is used in its generic and more popular sense to refer to any electrochemical device whether comprised of a single cell or a plurality of cells.

Batteries are important power sources in a wide range of consumer, industrial and military applications. A number of technologies have been developed to improve battery performance. Typically, such technologies have been directed to improving battery performance by increasing power and energy density provided by the batteries. Power refers to the instantaneous rate of electrical energy which can be delivered by a battery, and energy density is the total amount of energy that can be delivered per unit volume of the battery on a single charge. Since batteries are typically employed in connection with portable or otherwise mobile electronic devices, it will be appreciated that the energy density of a battery is a very important parameter.

In most power applications, a battery is used in combination with structural or support elements. For example, cellular phones enclose a battery and other electronics in a polymer case. Unmanned aerial vehicles (UAVs) typically include batteries which are mounted in a polymer composite air frame. Circuit boards for a variety of electronic devices have batteries supported thereupon. In order to improve the performance of such devices, efforts have been directed to improving the power and energy density of batteries so as to lessen weight and size burdens associated with incorporating them into electronic systems.

As will be explained hereinbelow, the present invention departs from the conventional, prior art approach to optimizing battery-powered electronic systems and devices. While the present invention aims to produce batteries having good power levels and energy densities, the approach of the present invention involves utilizing battery systems which function as structural elements of a device. The batteries of the present invention include components which themselves are rigid and strong; hence, the batteries of the present invention can function as panels, columns, beams, pylons, and other such structural elements of the articles in which they are incorporated. Since the batteries of the present invention essentially replace inert, nonpower-generating structural elements with power-generating structures, their weight and/or size burden on systems in which they are incorporated is very low. For example, portions of the air frame of an unmanned aerial vehicle may be fabricated from structural batteries. Hence, the overall weight of the vehicle will be reduced and/or the amount of electrical power carried by the vehicle can be significantly increased. It will be appreciated that similar power/weight/size benefits will be achieved with regard to other devices such as cellular telephones, other communications equipment, computers, and specialized electronic devices and systems. In such devices, the structural batteries of the present invention can function as circuit boards, housings, casings, protective members and the like. Further details and advantages of the present invention will be apparent from the drawings, discussion and description which follow.

SUMMARY OF THE INVENTION

Disclosed herein is a battery which may be employed as a structural component of an article of manufacture. The structural battery includes an anode, a cathode and an electrolyte, and the stiffness of the combination of the anode, cathode and electrolyte is generally at least 10 MPa, and in particular, between 10 MPa-1000 GPa, and is in some instances between 50 MPa-100 GPa. The failure strength of the combination of the anode, cathode and electrolyte is generally 1 MPa, and in particular instances between 1 MPa-10 GPa, and in specific instances is between 10 MPa-1 GPa. Herein, "stiffness" refers to the general engineering property of a material that describes the amount of stress required to impart strain on the material. The ranges in system stiffness values are intended to reflect a range of loading modes, including tension, compression, shear, bending, torsion, and any combination of these loads. Similarly, "failure strength" is intended to refer to the limiting stress required to cause irreversible damage to the material, and is intended to reflect a range of loading modes, including tension, compression, shear, bending, torsion, and any combination of these loads.

In particular instances, the structural battery includes a solid electrolyte having a stiffness of at least 1 MPa, and in other instances, the stiffness of at least one of the anode and the cathode is at least 1 MPa.

The electrolyte may, in some instances, have an ionic conductivity of at least $10^{-9}$ S/cm, and in some instances at least $10^{-7}$ S/cm, and in particular instances at least $10^{-5}$ S/cm. In certain embodiments, the electrolyte is comprised of an ionic material that is contained within an uncrosslinked polymeric material or an at least partially crosslinked polymeric material, and an additional liquid solvent may or may not be added. In other embodiments, the electrolyte is comprised of a polyelectrolyte. In certain instances, the electrolyte may include a reinforcing material therein. In some embodiments, the anode and/or cathode is comprised of a metal substrate coated with an ion donor and an ionic and/or electronic conductive filler. The substrate may comprise expanded metal foils, woven metal meshes, foamed metals, or bulk metals. In other embodiments, at least one of the anode and cathode may comprise an electrically conductive filamentary material such as a body of carbonized fabric. Carbonized fabrics include, but are not limited to, carbon fibers, woven carbon fiber fabric, random carbon fiber fabric, carbon paper, carbon nanotube mat, and graphite-based mat.

Another aspect of the present invention comprises a solid electrolyte material which may be employed in a structural battery. The electrolyte is contained within or comprises a body of an uncrosslinked polymeric material or an at least partially crosslinked polymeric material, and the electrolyte has a stiffness of at least 1 MPa and an ionic conductivity of at least $10^{-9}$ S/cm, and in some instances at least $10^{-7}$ S/cm, and in particular instances at least $10^{-5}$ S/cm. In a particular instance, the body of polymeric material includes resins which form comb polymer segments, and crosslinking monomers which form a continuous network. The linear resins may include vinyl esters, such as polyethylene glycol.

DESCRIPTION OF THE PREFERRED EMBODIMENTS

The present invention includes structural batteries, which as described above, are batteries which include one or more active components having sufficient strength and rigidity to allow these batteries to function as structural elements in various constructions and devices. The structural batteries of the present invention, in common with all batteries, will include an anode, a cathode, and a body of electrolyte material disposed therebetween. It is a feature of the present invention that the anode, cathode and electrolyte, taken in combination, have a stiffness which is at least 10 MPa, and in specific instances between 10 MPa-1000 GPa, and in some embodiments between 50 MPa-100 GPa, as measured in accord with conventional practices well known in the engineering arts. In addition to the foregoing, the failure strength of the combination of anode, cathode and electrolyte is generally between 1 MPa-10 GPa, and is in some instances between 10 MPa-1 GPa. In some typical applications, the energy density of the present batteries is at least 0.1 J/cc, and in particular instances at least 10 J/cc.

The various elements of the battery may differ in stiffness and failure strength; however, taken collectively, some or all contribute to the strength and integrity of the battery. In specific instances, the stiffness of the electrolyte is at least 1 MPa, and the stiffness of the anode and/or the cathode will be also at least 1 MPa.

It is to be understood that the structural batteries of the present invention may be fabricated utilizing various battery chemistries; however, for purposes of illustration, the invention will be explained with specific reference to a lithium ion battery system, although the invention is not limited to such systems. In a typical lithium ion battery, lithium ions move between an anode and a cathode, through a lithium ion conductive electrolyte during the discharge and charge cycle of the battery. In accord with general conventions, the cathode of the battery is a source of lithium ions, and the anode operates to intercalate or otherwise take up lithium ions. In the operation of a battery of this type, lithium ion flow, during the discharge of the battery, is from the anode to the cathode, while ion flow is from the cathode to the anode during the charging of the battery.

Figure 1:
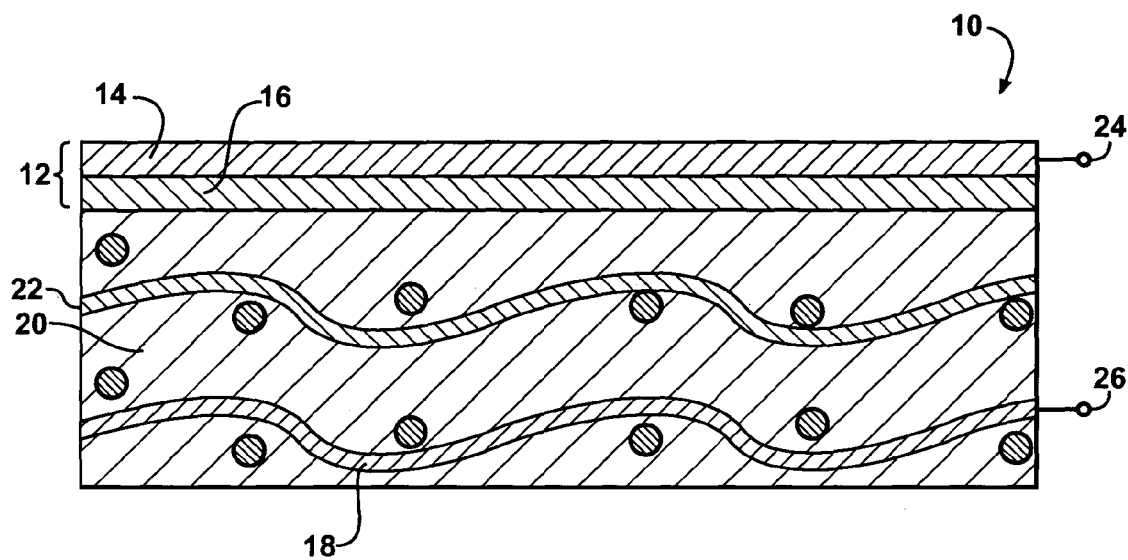
FIG. 1 is a cross-sectional view of one embodiment of structural battery which may be fabricated in accord with the principles of the present invention.

Variously configured structural lithium ion batteries may be fabricated in accord with the present invention. FIG. 1 depicts a cross-sectional view of one such battery 10. The battery includes a cathode 12 which is comprised of a rigid current collector 14, coated with a lithium donor material 16. The current collector 14 may comprise an electrically conductive body such as a simple metal plate, or it may comprise a metal mesh, a textured body of metal, an expanded body of metal, a metal foam, or the like. The lithium ion source 16 may comprise lithium metal, lithium alloys, or compounds of lithium as is known in the art. Some compounds of lithium which may be employed include lithium transition metal oxides and lithium transition metal phosphates, where the transition metal includes Mn, Fe, Ti, V, Co or Ni.

The battery 10 of FIG. 1 further includes an anode, which in this embodiment is comprised of a layer of electrically conductive carbon fabric 18, which can operate to intercalate lithium ions. It is to be understood that anodes of other configurations and other materials may be readily incorporated into batteries of this type. Such anodes may comprise metal bodies having appropriate materials coated onto or absorbed thereinto, as well as composite materials as is known in the art.

A body of a solid electrolyte material 20 is disposed so as to impregnate the carbon fabric anode 18 and contact the cathode 12. The electrolyte 20 is operable to conduct lithium ions between the anode 12 and cathode 18, and in this regard should have at least a reasonably good lithium ion conductivity. In some particular embodiments, the lithium ion conductivity is at least $10^{-9}$ S/cm, in other instances at least $10^{-7}$ S/cm, and in particular instances at least $10^{-5}$ S/cm. As illustrated, a body of glass fiber material 22 is disposed in the electrolyte 20 between the anode 18 and cathode 12. This glass fiber material acts as a separator membrane and/or as a reinforcement for the electrolyte 20. Other electrically insulating, reinforcing fabrics can also be used as a separator membrane, such as fabrics composed of polymeric fibers including aramid (such as Kevlar®), ultrahigh molecular weight polyethylene (such as Spectra®), poly p-phenylene benzobisoxazole (such as Zylon®), nylon, polyethylene, polypropylene, or combinations thereof. Other reinforcing materials such as mineral fibers, ceramics, polymers, and the like may also be used as a reinforcement material to enhance the strength and rigidity of the electrolyte 20. These reinforcement phases can take the form of particles, short chopped fibers, colloids, fumed particles, fumed particle clusters, and can include materials such as clays, zeolites, glasses, ceramic metal oxides, ion-conductive ceramics, and carbon-based materials such as graphite, carbon nanotubes, or fullerenes.

The electrolyte of the present invention may also be reinforced by an interpenetrating network of structural polymer. In one particular embodiment, a foamed structural polymer is formed through reaction of a dispersed foaming agent, or through a supercritical carbon dioxide process, or through removal of a scavengeable filler such as salt particles that are removed by an aqueous wash, or through selective thermal or chemical removal of a secondary polymer phase as in the case of a block copolymer or polymer blend. The void space in the foamed polymer can then be backfilled by the electrolyte.

There are a variety of materials which may be employed as the electrolyte 20, and one particular group of materials which may be used in the present invention comprise ion conductive, polymer electrolytes. The electrolyte for the structural batteries of the present invention should be designed to balance structural and ion conduction properties, and such may be accomplished by controlling the structure and composition of the polymeric material itself through the use of functionalized structural polymers, block copolymers, or microscale mixtures of conductive and structural materials, as well as by introducing the ionic species either by doping a polymer host with an ionic material such as a lithium salt that may or may not have an additional liquid solvent, or by covalently affixing the ionic material directly on the polymer host to form a polyelectrolyte. Typical routes for improving polymer structural properties, such as increasing crosslink density, lead directly to decreases in ion conductivity. However, through appropriate design, combinations of structural rigidity and ion conduction may be achieved. In some specific instances, polymer electrolytes for use in the present invention include oligo(oxyethylene) units such as polyethylene glycols (PEG). Such PEG oligomers readily dissolve lithium salts. A balance of mechanical and electrochemical properties is achieved by utilizing partially crosslinked polymer electrolyte matrices that combine linear and crosslinking resin monomers. The linear monomers will, in some embodiments, form comb polymers with freely mobile PEG side chains that facilitate ion conductivity, while the crosslinking monomers form continuous polymer networks giving mechanical strength and stiffness to the electrolyte. Acrylated and methacrylated monomers may be employed in some embodiments, as well as crosslinking monomers with multiple functional groups, including but not limited to difunctional, trifunctional, tetrafunctional, and pentafunctional crosslinking monomers.

As shown in FIG. 1, the battery 10 further includes leads 24, 26 electrically communicating, respectively, with the cathode 12 and anode 20. It is to be understood that a plurality of cells of the type shown in FIG. 1 may be electrically interconnected in a series, parallel or mixed series parallel relationship to provide appropriate voltages and currents for specific applications. Furthermore, the cell 10, as well as assemblies thereof, may be further coated with, encapsulated in, or otherwise protected by an appropriate material.

The batteries of the present invention are rigid units, and as such are capable of functioning as structural elements in a variety of constructions. The batteries may be configured in a variety of cross-sectional shapes, and in various lengths. As such, the batteries may comprise hollow tubes, sheets, plates, honeycomb structures, as well as more complicated shapes. For example, the batteries of the present invention may be configured to form a protective casing or housing for a piece of equipment. The batteries may be configured as body panels of vehicles, support frames, or as components of protective devices such as helmets, ballistic armor, and the like.

Experimental Details

A series of solid, polymer electrolytes were synthesized in accord with the present invention. These electrolytes were prepared from monomers received from the Sartomer Company, Inc. Polyethylene glycol with a molecular weight of 550 (PEG-550) monoacrylate comb resin was used in all cases as a linear, primary ion-conducting phase. Nine difunctional and two trifunctional monomers were used as structural crosslinking components, and these systems are summarized in Table 1 hereinbelow.

TABLE 1

| Resin System | Abbreviation |
|---|---|
| 1 | PEG-200 (a) |
| 2 | PEG-400 (m) |
| 3 | PEG-400 (a) |
| 4 | PEG-600 (m) |
| 5 | PEG-600 (a) |
| 6 | Bis-A 15, 15 (m) |
| 7 | Bis-A 15, 15 (a) |
| 8 | Bis-A 5, 5 (a) |
| 9 | Bis-A 2, 2 (a) |
| 10 | TMP 3 (a) |
| 11 | TMP 5 (a) |

The difunctional monomers of systems 1-9 yield a single linear crosslink between polymer chains upon curing. For resin systems 1-5 this crosslink consists of a PEG group with a molecular weight of 200, 400 or 600 as detailed in Table 1. For resin systems 6-9 this crosslink consists of two equal PEG chains on either side of a bisphenol-A group where the PEG chains have either 2, 5 or 15 repeat units, as summarized in Table 1. Resin systems 10 and 11 are trifunctional with a trimethylpropane node that connects to three polymers through 1 (TMP 3) or 5 (TMP 5) units of PEG. The parenthetical notations (a) and (m) in Table 1 indicate that the monomer types were tested with acrylated (a) end groups or methacrylate (m) end groups. For each resin system, a series of samples were prepared, each sample having a different weight percentage of the comb versus crosslinking component. The proportions varied from 75% comb to 50% comb to 25% comb. Control samples were also prepared and they included 100% comb (all PEG-550) and 0% comb (no PEG-550).

In preparing the polymer electrolytes, all chemicals were handled in a glove box under dry nitrogen to prevent exposure to moisture. Lithium trifluoromethanesulfonate was dissolved directly into the monomers at 10 weight percent (relative to mass of PEG in resin). Subsequently, 1.5 weight percent (relative to total mass of resin) organic peroxide initiator (Trigonox), and 1.0 weight percent (relative to total mass of resin) dimethylaniline were added. The samples were heated in pellet-shaped silicone rubber molds at 80° C. under nitrogen for 12 hours, followed by a 100° C. post-cure treatment for 1 hour. This produced hardened pellets of the polymer electrolyte material. The pellets were painted on both sides with quick drying silver paint and further heated to 80° C. under vacuum for 12-24 hours to remove residual solvent. The final geometry of each pellet was approximately 12.3 mm in diameter by 3-4 mm thickness.

Conductivity values for the thus-prepared pellets were calculated from data collected through impedance spectroscopy over a frequency range of 10 Hz to $10^6$ Hz at 20° C. in an environmentally controlled zero-humidity room. Uniaxial compression testing was carried out on the samples to evaluate their mechanical properties.

Figure 2:
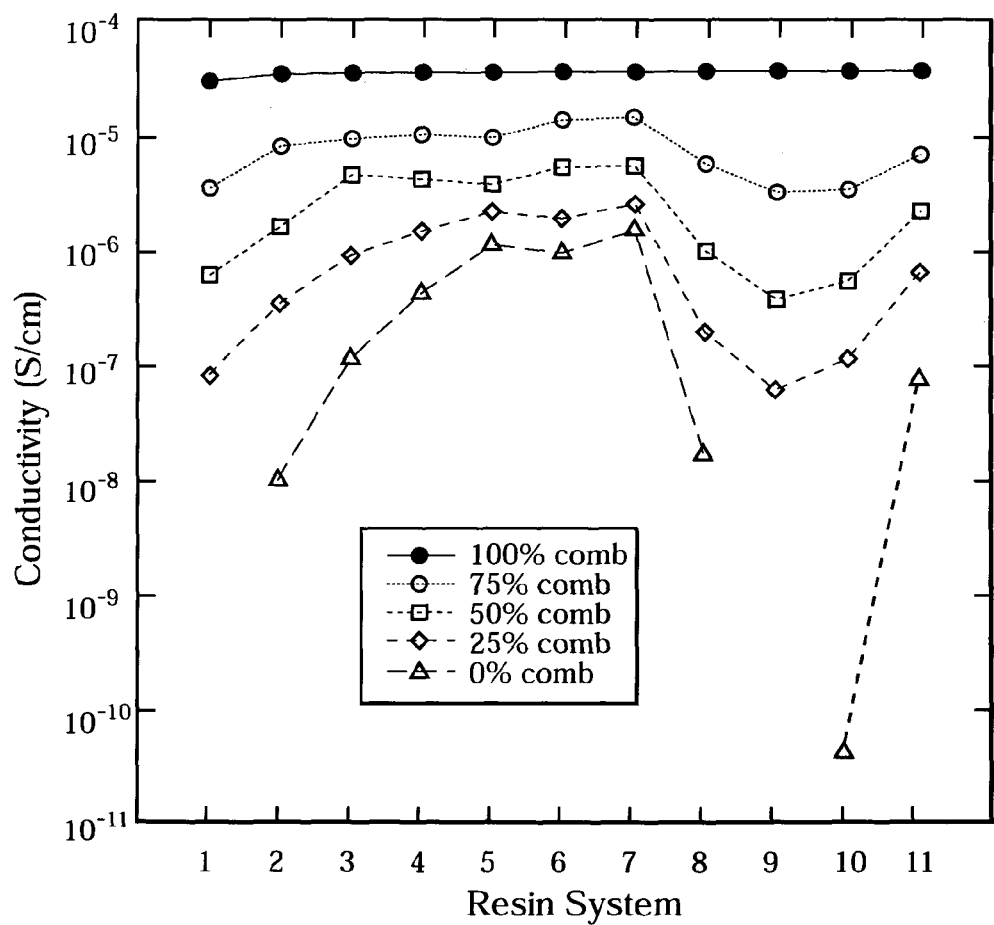
FIG. 2 is a graph showing ionic conductivity, as a function of the proportion of comb polymer material, for a series of resin systems which may be employed to prepare the solid electrolytes of the present invention.

FIG. 2 is a graph summarizing the data from the conductivity evaluation. The graph lists the eleven different resin systems along one axis, and conductivity along the other axis. The various curves correspond to the various amounts of comb resin for each sample. As will be seen, ionic conductivity correlates positively with the amount of comb resin present. The highest conductivity is observed for 100% comb resin while the 0% comb curve represents the conductivity of the base resins. An absence of data indicates zero conductivity. Each data point is an average of measurements from at least two samples with 15% standard deviation. In general, increasing comb content increases resin conductivity. Longer crosslinks also increase conductivity. While not wishing to be bound by speculation, the inventors hereof presume that this may be due to overall increases in polymer mobility and decreases in network density. Acrylated systems demonstrate somewhat better conductivity than methacrylated systems, and the presence of bis-A groups produces a slight inhibition of conductivity.

Figure 3:
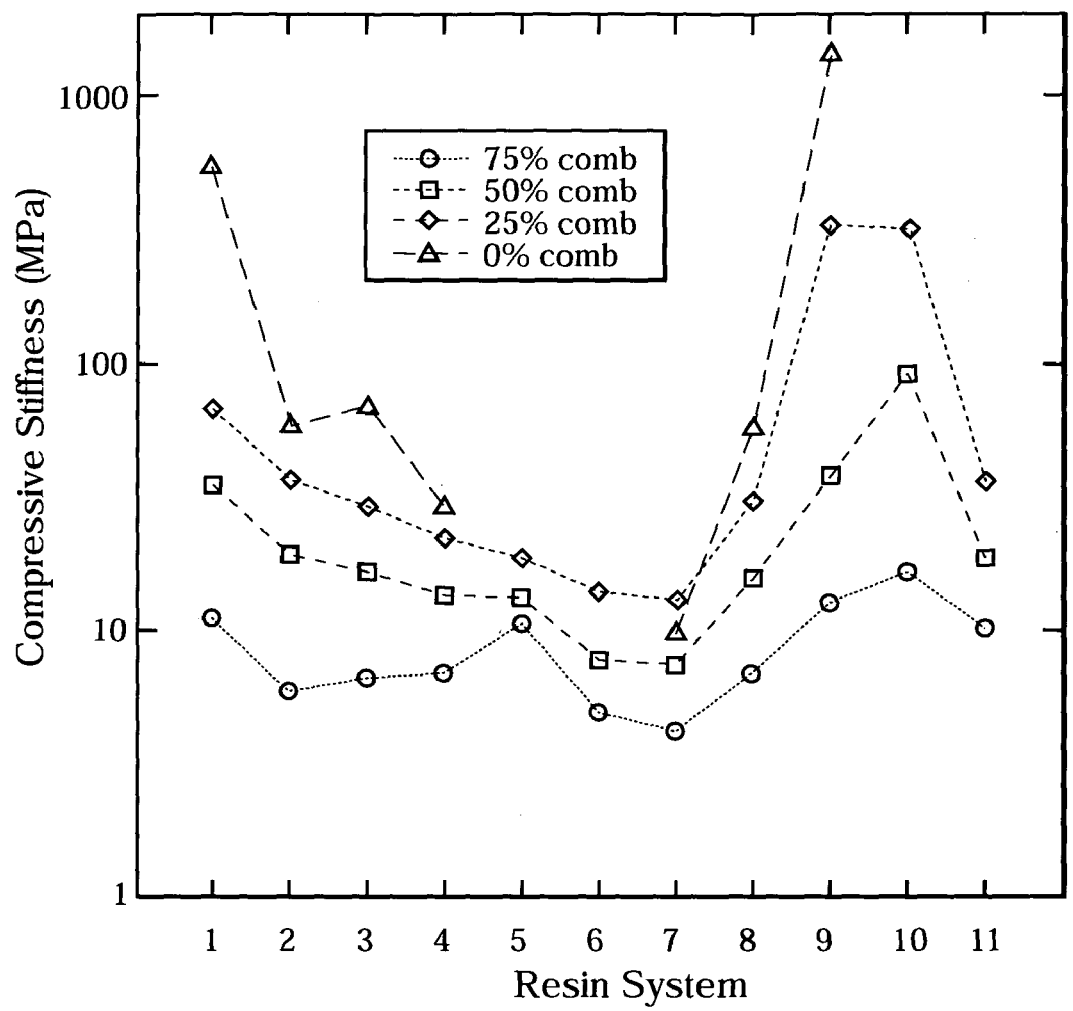
FIG. 3 is a graph showing compressive stiffness as a function of comb content for the resin systems of FIG. 2.
Figure 4:
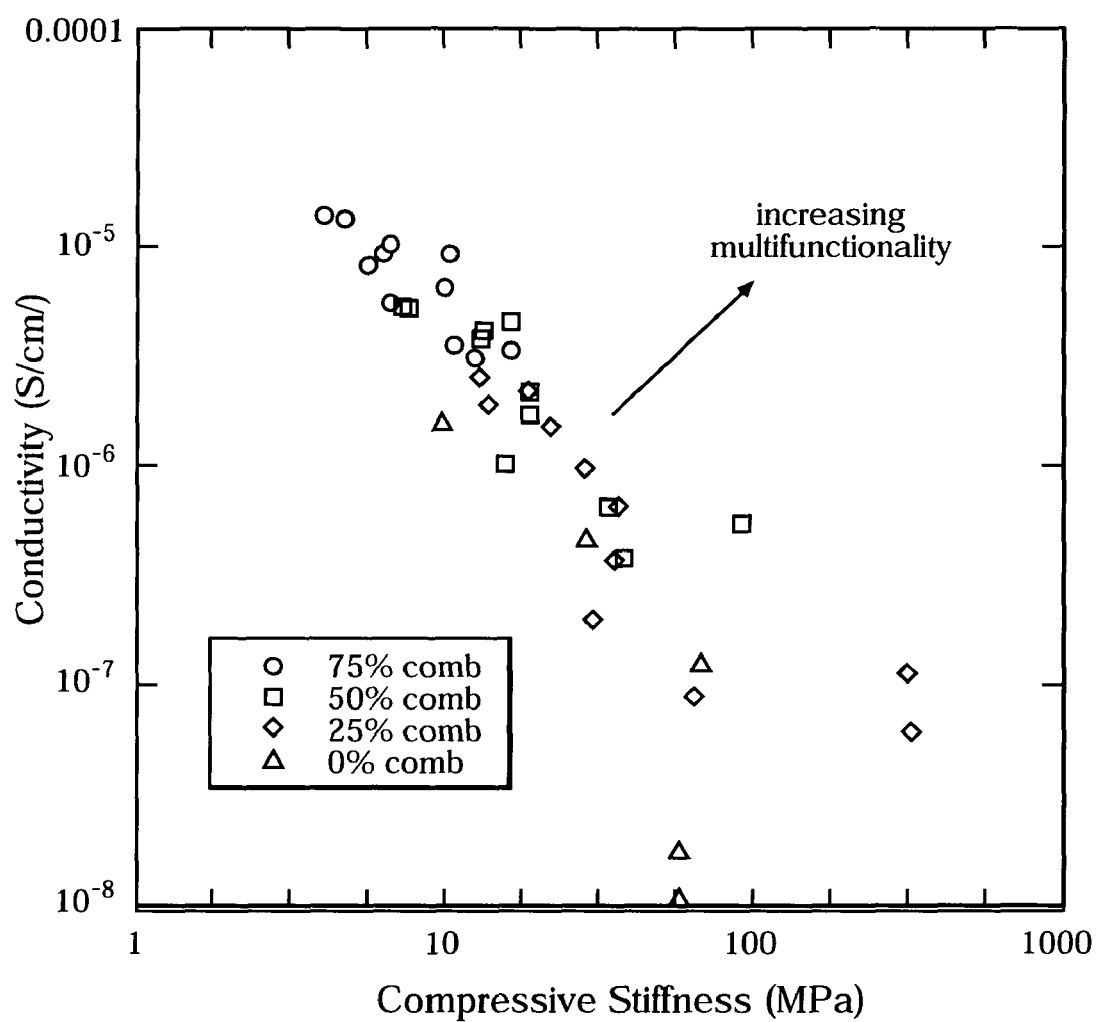
FIG. 4 is a graph showing ionic conductivity versus compressive stiffness for the resin systems.

FIG. 3 is a graph showing compressive stiffness of the resin systems. The stiffness values span three orders of magnitude from below 10 MPa to above 1 GPa. FIG. 4 is a plot of conductivity as a function of compressive stiffness for the resins. These results clearly illustrate that conductivity decreases as resin stiffness increases. This reflects the fact that conductivity is enhanced by polymer mobility at low crosslink density, while stiffness follows opposite trends.

In view of the teaching and data presented herein, one of skill in the art can formulate resins with a balanced combination of mechanical properties and ion conductivity to suit various battery applications. In accord with the present invention, it is clear that still further improvements in performance of the electrolyte will be realized by further increasing the relative performance of the electrolyte with respect to conductivity and stiffness as indicated by the arrow in FIG. 4. Furthermore, as mentioned above, reinforcing fibers, particles, fabrics or the like may be added to the electrolyte resin without impeding its ion transport properties, and doing so will further enhance the mechanical properties of the resin. In addition, it will be appreciated that techniques utilized for the manufacture of high strength polymeric composites can be readily adapted for use in the present invention to further strengthen the polymer matrix. Such techniques can involve the use of laminated layers of multiple materials, incorporation of reinforcing materials and the like. In such instances, it is worth noting that for polymer matrix composites reinforced by stiff fibers, matrix properties only dominate shear and interlaminar mechanical properties while tensile properties are largely governed by fiber properties, so that through proper laminate and part design it will be possible to minimize the effect of matrix stiffness on global composite performance. In view of this teaching, one of skill in the art can readily tailor both the electronic and physical properties of the electrolyte material for particular applications.

There are a variety of techniques which may be utilized for the preparation of structural batteries in accord with the present invention. In one instance, an appropriate electrolyte resin mixture may be disposed between appropriately configured electrodes and subsequently cured to produce a rigid, structural battery. In particular instances, a vacuum-assisted transfer molding process may be employed wherein a vacuum or low atmospheric pressure is used to draw a resin into a space between two electrodes. In other instances, the battery structures may be built up by laminating electrodes onto a previously cured body of polymeric electrode material. Lamination may be enhanced by use of heat and/or pressure and/or appropriately conductive adhesives, which adhesives may include electrolyte resin formulations. In yet other instances, an electrolyte resin formulation may be impregnated into a glass cloth or other separator structure which may then be interleaved and/or rolled together with sheets of anode and cathode material and subsequently cured. Such techniques are known and available in the art and are used in the fabrication of what is referred to as "prepreg" resin structures. Yet other techniques which are, or come to be, known in the art may be adapted for the fabrication of the battery systems of this invention. It is also to be understood that while the foregoing has provided a detailed description of systems which include a solid, polymer electrolyte, structural batteries of the present invention may also be prepared utilizing liquid, gelled, or other nonsolid electrolytes used in combination with relatively rigid anodes and/or cathodes, provided that the requisite strength is achieved.

The longevity and performance of batteries are often compromised by contact with external agents, such as moisture or oxygen. Barrier materials are often incorporated into batteries to protect them from these external agents. These barrier agents can be directly incorporated into the present invention during initial fabrication or through secondary fabrication steps. Barrier materials could include metal foils or metalized polymer films, which could be directly bonded to the battery during cure of the electrolyte matrix.

In view of the foregoing, it is to be understood that numerous modifications and variations of the present invention may be implemented by those of skill in the art. The foregoing drawings, discussion and description are illustrative of some specific embodiments, but are not meant to be a limitation upon the practice thereof. It is the following claims, including all equivalents, which define the scope of the invention.

The invention claimed is:

1. A battery used as a structural element in a device in which the battery is incorporated, the battery comprising:
   an anode;
   a cathode; and
   a solid electrolyte;
   wherein the combined anode, cathode and solid electrolyte forms a rigid unit and the rigid unit that consists essentially of the anode, the cathode, and the solid electrolyte collectively possesses a compressive stiffness of at least 10 MPa.

2. The battery of claim 1, wherein said combined anode, cathode and solid electrolyte collectively possesses a compressive stiffness of at least 100 MPa.

3. The battery of claim 1, wherein said combined anode, cathode and solid electrolyte possesses a compressive stiffness in the range of 50 MPa to 100 GPa.

4. The battery of claim 1, wherein the combined anode, cathode and solid electrolyte possesses a failure strength of at least 1 MPa.

5. The battery of claim 1, wherein said combined anode, cathode and solid electrolyte possesses a failure strength of at least 10 MPa.

6. The battery of claim 1, wherein said combined anode, cathode and solid, electrolyte possesses a failure strength in the range of 1 MPa to 10 GPa.

7. The battery of claim 1, wherein said battery has an energy density of at least 0.1 J/cc.

8. The battery of claim 1, wherein the solid electrolyte has a stiffness of at least 1 MPa.

9. The battery of claim 1, wherein one of the anode and the cathode has a stiffness of at least 1 MPa.

10. The battery of claim 1, wherein the solid electrolyte has an ionic conductivity of at least $10^{-9}$ S/cm.

11. The battery of claim 1, wherein the solid electrolyte includes a polymer.

12. The battery of claim 11, wherein the polymer is at least partially crosslinked.

13. The battery of claim 12, wherein the polymer comprises from about 25 weight percent comb units to about 75 weight percent comb units.

14. The battery of claim 1, wherein said solid electrolyte comprises oligo(oxyethylene) units.

15. The battery of claim 1, wherein said solid electrolyte has a compressive stiffness of at least 1 MPa and an ionic conductivity of at least $10^{-9}$ S/cm.

16. The battery of claim 1, wherein the solid electrolyte comprises a body of polymeric material which includes linear resins which form comb polymer segments, and crosslinking monomers which form a continuous network.

17. The battery of claim 16, wherein said linear resins include vinyl esters.

18. The solid electrolyte of claim 17, wherein said vinyl esters comprise vinyl ester derivatives of polyethylene glycol.

19. The solid electrolyte of claim 16, wherein said linear resins comprise acrylate groups or methacrylate groups.

20. The solid electrolyte of claim 19, wherein said linear resins comprise acrylate groups.

21. The solid electrolyte of claim 19, wherein said linear resins comprise methacrylate groups.

22. The battery of claim 1, wherein the solid electrolyte has an ionic conductivity of at least $10^{-7}$ S/cm.

23. A battery used as a structural element in a device in which the battery is incorporated, the battery comprising:
   an anode;
   a cathode; and
   a solid polymer electrolyte that comprises from about 25 weight percent comb units to about 75 weight percent comb units, is a solid at room temperature, has a stiffness of at least 1 MPa and has an ionic conductivity of at least $10^{-9}$ S/cm;
   wherein the combined anode, cathode and solid electrolyte forms a rigid unit wherein the rigid unit that consists essentially of the anode, the cathode and the solid electrolyte collectively possesses a compressive stiffness of at least 10 MPa and a failure strength of at least 1 MPa.

* * * * *